J. W. EVISTON.
LUBRICATOR.
APPLICATION FILED OCT. 19, 1915.
1,204,145.
Patented Nov. 7, 1916.
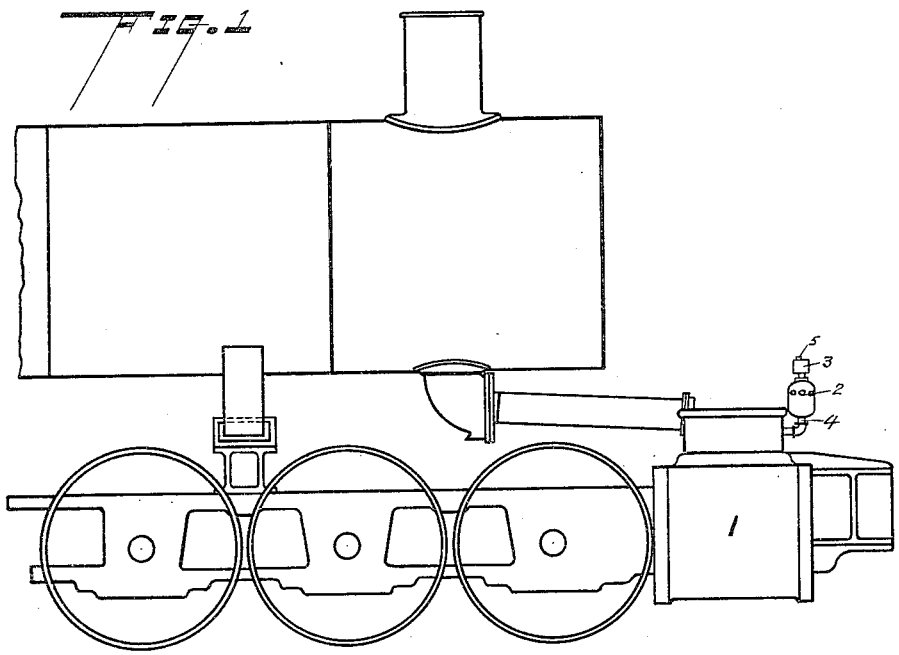
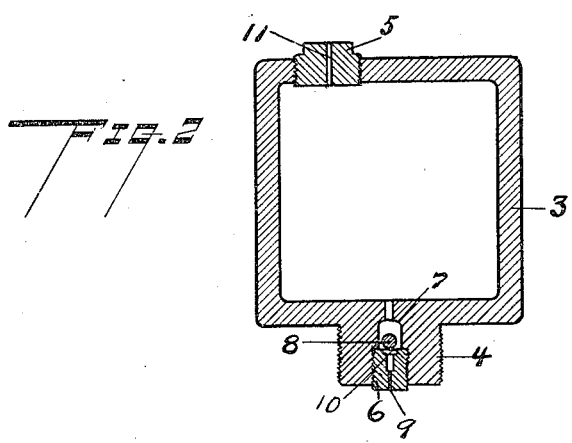
WITNESSES:
INVENTOR
John W. Eviston
BY
Geo. B. Willcox
ATTORNEY

UNITED STATES PATENT OFFICE.

JOHN W. EVISTON, OF MILWAUKEE, WISCONSIN, ASSIGNOR TO THE UNITED STATES GRAPHITE COMPANY, OF SAGINAW, MICHIGAN, A CORPORATION OF MICHIGAN.

LUBRICATOR.

1,204,145.   Specification of Letters Patent.   Patented Nov. 7, 1916.

Application filed October 19, 1915. Serial No. 56,767.

*To all whom it may concern:*

Be it known that I, JOHN W. EVISTON, a citizen of the United States, residing at Milwaukee, in the county of Milwaukee and State of Wisconsin, have invented certain new and useful Improvements in Lubricators; and I do hereby declare the following to be a full, clear, and exact description of the invention, such as will enable others skilled in the art to which it appertains to make and use the same.

This invention is a device adapted to automatically feed small quantities of finely powdered graphite into the cylinder of an engine which is operated by steam, and the improvement consists in the construction and combination of the parts of the lubricating device and its mode of operation in conjunction with the valves and cylinders and pistons of such an engine.

As is well known, a steam engine operated by highly superheated steam can not be properly lubricated by oil alone, but must be supplied with finely powdered graphite introduced into the cylinder in small quantities and at suitable intervals of time, in order to prevent the cutting or scoring of the valves, cylinders and piston rings.

I have found in practice that finely powdered graphite can be satisfactorily introduced into the cylinder of an engine such as a locomotive by attaching to the relief valve of the cylinder, or to an equivalent part of the engine, a container partly filled with powdered graphite and provided with suitable means for automatically delivering the graphite in small quantities to the cylinder.

In the accompanying drawings I have shown one preferred construction of the lubricator which forms the subject of my invention, and have shown diagrammatically the preferred arrangement of the lubricator with relation to the relief valve, cylinder and steam chest.

The invention comprises the devices shown and described and the equivalents thereof.

In the drawings, Figure 1 is a diagrammatic view showing the lubricator applied to a relief valve attached to the steam chest of a locomotive. Fig. 2 is a vertical section through the lubricator.

As is clearly shown in the drawings, 1 represents the cylinder of a locomotive. 2 is the relief valve, and 3 the chamber of the lubricator. This chamber is preferably formed with a threaded boss 4 at its bottom, by which it is screwed to the top of the relief valve, or to any equivalent part of the steam chest or cylinder, and is provided with a filling plug 5. The threaded boss 4 is preferably bored and internally threaded to receive an apertured bushing 6, above which is an inverted apertured valve seat 7 that communicates with the chamber 3. A vertically movable ball valve 8 is loosely received in the space between the top of bushing 6 and the valve seat 7. The apertured bushing normally connects the interior of chamber 3 with the steam space of the engine, or with the relief valve, and permits the graphite to escape in minute quantities from the chamber through its aperture 9. The ball 8 does not close the aperture 9, but normally rests on a suitable projection or support 10. The filling plug 5 is preferably provided with a small vent-hole 11 to admit air to the upper part of chamber 3.

In locomotive practice it is customary to shut off the steam and permit the locomotive to "drift" when running down grade, or approaching a stop. When the engine drifts, the piston acts as a pump, the suction of which is transmitted past the ball check valve 8 to the mass of powdered graphite in chamber 3, permitting a small amount of the graphite to be drawn into the cylinder at each stroke of the piston. When steam is admitted to the cylinder the pressure lifts the ball 8 and holds it to close the aperture of seat 7, and no graphite will be fed to the cylinder until the pressure is reduced. Through the vent hole 11 of plug 5 atmospheric pressure is maintained above the mass of graphite in chamber 3 to facilitate feeding when the engine drifts and suction occurs. When steam pressure is on, the lifting of ball 8 against its seat 7 prevents graphite being blown out through vent 11, and the ball valve enables the chamber to be re-filled with graphite while the steam is on. In some cases the vent 11 may be dispensed with, but when the lubricator is placed on top of the relief valve as shown in Fig. 1, the vent is desirable, because the force of suction is small on account of air leakage through the air-openings in the shell of the relief valve. No regulation is required by the engineer, as the aperture of the choke plug 9 is made of such size that the correct amount of graphite will be supplied at each stroke of the piston.

By the means above described, I have produced a lubricator of simple, compact and durable construction that requires no adjustment, is not likely to get out of order and will automatically feed the required amount of graphite to the engine cylinder whenever the engine is allowed to "drift" or run with the steam shut off. At other times when the engine is taking steam, practically no graphite is fed to the cylinders.

Having thus described my invention, what I claim and desire to secure by Letters Patent is:

1. In a graphite-feeding lubricator, the combination of a chamber, an apertured filling plug, a vertically movable ball valve beneath the chamber, an inverted apertured valve seat above said ball valve and communicating with the interior of said chamber, and an apertured bushing, said bushing received in a recess formed in the bottom of said chamber, and adapted to retain said ball.

2. In a graphite-feeding lubricator, the combination of a chamber formed with a threaded boss at its bottom, an apertured filling plug, a vertically movable ball valve within said boss, an inverted apertured valve seat in said boss and located above said ball valve, said seat communicating with the interior of said chamber, an apertured bushing received in a recess formed in said boss, said bushing supporting said ball to hold it away from the aperture of said bushing, for the purposes set forth.

In testimony whereof, I affix my signature in presence of two witnesses.

JOHN W. EVISTON.

Witnesses:
JAMES G. DROUGHT,
C. O. SHEPHERD.

Copies of this patent may be obtained for five cents each, by addressing the "Commissioner of Patents, Washington, D. C."